U̶n̶i̶t̶e̶d̶ ̶S̶t̶a̶t̶e̶s̶ ̶P̶a̶t̶e̶n̶t̶ ̶O̶f̶f̶i̶c̶e̶

2,820,802
Patented Jan. 21, 1958

2,820,802

FATTY OIL ACID ESTER

Cornelius Austin Sprang and Richard W. Webster, Cincinnati, Ohio, assignors to Emery Industries, Inc., Ivorydale, Ohio, a corporation of Ohio No Drawing. Application June 26, 1948
Serial No. 35,515

1 Claim. (Cl. 260—404.8)

This invention relates to vinyl resins and is directed particularly to improvements in the art of plasticizing them. Representative vinyl resins to which the invention is applicable are polyvinyl halides, modified vinyl resins and copolymers of vinyl halides and vinyl acetate. The invention relates to new plasticizing agents by which plasticized vinyl resins displaying unusual and desirable properties may be obtained.

In general, vinyl resins are hard, tough, and frequently brittle compositions, which by themselves, are not particularly useful for a variety of purposes. However, compounding of the resins with softening agents or plasticizers enables the production of compositions having favorable characteristics such as flexibility and stretchability coupled with toughness. The principal problem in the past has been to accomplish softening of the resins without impairing the other desirable characteristics which vinyl resins display.

The principal plasticizers which have been used in the past are of two general types; (a) solvent plasticizers, and (b) resin plasticizers. Representative solvent plasticizers are tricresyl phosphate, dibutyl phthalate, diethylene glycol dipelargonate, and the like. These materials have a relatively high solvent power for vinyl resins, and also a relatively high boiling point, coupled with low viscosity. However, over a period of time, some solvent plasticizers tend to "spew" from the product; that is, the plasticizer migrates to the surface and may damage a surface with which the finished resin comes into contact. On the other hand, for many purposes, the volatility of solvent plasticizers is high in relation to the temperature of the environment in which the plasticized resins will be used, and during use, the plasticizer gradually disappears by evaporation, with the result that the product tends to lose its rubber-like properties, and over a period of time becomes hard, inflexible and of an embrittled nature. The solution to such difficulties has been approached from the point of view of increasing the chain length of the solvent plasticizers in the hope of obtaining benefits from attendant increase in the boiling point thereof. Thus, following this theory, dibutyl phthalate has been replaced by dioctyl phthalate, which is much less volatile, but dioctyl phthalate is too volatile for many uses. Still further extension of the theory, as, for example, by the use of didecyl phthalate, is not possible because of the limited compatibility of the higher molecular weight products with the vinyl resins.

Resinous plasticizers are usually long chain, high molecular weight, viscous liquids or solids having little solvent power for the vinyl resins, but producing the desired plasticizing or softening by a dilution effect. Such resinous products are not volatile, and they do not tend to migrate, but, since they are less efficient than solvent plasticizers, excessive quantities must be employed to produce the desired softneess, and the use of excessive quantities is attended by loss of the desired qualities of toughness and stretchability which make the vinyl resins unique for many purposes. For this reason, resinous plasticizers are not used to produce vinyl resins in which pronounced softness or flexibility is requisite. The same dilution effect which produces a quality of softness or flexibility also "dilutes" or decreases the strength of the vinyl resin, since the resinous plasticizer itself has poor strength properties. The resinous plasticizers also impart very poor low temperature performance characteristics and they are usually quite expensive.

Blends of solvent and resin plasticizers are mere compromises, in which the undesirable qualities of both are present to greater or lesser degree depending upon the ratios and amounts of the types employed.

The principal objective of this invention has been to produce plasticized vinyl resin compounds permanently displaying both desired flexibility or softness in conjunction with great strength. The objective also has been to provide plasticizers which remain efficient in function at low and high temperatures, which are free of obnoxious odor, and which do not tend to migrate or spew from the resins with which they are compounded.

The plasticizer products of the present invention are low molecular weight polymers comprising linear esters of a glycol or polyglycol, at least one dibasic acid, and at least one monobasic acid, the latter constituting terminal groupings of the ester. Otherwise expressed, this invention is based upon the determination and discovery that plasticized vinyl resins, having the desired qualities which have been described, may be produced by compounding therewith linear polymers consisting of a product of esterification of a dibasic acid, a dihydric alcohol and a monobasic acid proportioned to produce termination of the chain by the monobasic acid. Such compounds are represented by the general formula $RX(YX)_nR^1$, in which R and $R^1$ are monobasic acids of the same or different numbers of carbon atoms, X is a dihydric alcohol i. e., glycol or polyglycol, Y is a dibasic acid, and $n$ is an integer or fraction greater than 1 and less than 8.

The dibasic acid used in the esterification is one containing 6 to 10 carbon atoms, representative dibasic acids being, for example, adipic, azelaic, sebacic and phthalic. Short chain length in the dibasic acid, that is, lower than 6, is not desirable as the oxygen content of the molecules in the finished product is bunched and the final ester product fails to display the desirable solubilizing effect, while if the chain length is too great, the ratio of carbon to oxygen becomes too high and again incompatibility results.

The monobasic acid employed in the esterification is an aliphatic monobasic acid which may contain 6 to 18 carbon atoms in chain length, and, preferably one in which the number of carbon atoms does not exceed by substantially more than 25%, the number of ester groups in the base chain of the ester which is to be produced. Representative suitable monobasic acids are caproic, caprylic and capric acids, having 6, 8 and 10 carbon atoms respectively, mixtures of monobasic acids such as are found in the toppings of coconut oil, pelargonic acid, 2-ethyl butyric and 2-ethyl hexoic acid, as well as synthetic monobasic acids derived from oxidized petroleum.

In general, it is desired that the ratio of carbon atoms to oxygen atoms in the completed ester molecule be approximately 3 to 1. Low molecular weight monobasic acids tend to increase the volatility of the final plasticizer and, in practice, it is desirable to use monobasic acids of as long a chain length as is consistent with the compatibility of the plasticizing ester with the vinyl resin to be plasticized.

The dihydric alcohol preferably is a simple or polyglycol containing 3 to 6 carbon atoms in chain length as, for instance, mono, di, or tri ethylene glycol; mono or di propylene glycol; 1, 4-butane diol; 1, 5-pentane diol; and 1, 6-hexane diol. Glycols containing less than 3 carbon atoms have been found generally to produce products having undesirable physical characteristics while if the chain length is greater than 6, the total oxygen-carbon ratio is adversely affected.

Esterification of the components in admixture is conducted in accordance with conventional esterification procedure. For example, the components are heated together in a suitable vessel at atmospheric pressure for a period of time sufficient to substantially complete esterification, after which completion is forced by application of vacuum, until a suitably low acid value is obtained, such as 2 to 12 depending on the end use. Where extremely low volatility is desired the small amount of glycol esters of monobasic acids present may be removed by stripping at a low absolute pressure under suitable conditions of time and temperature. It has been found that 250° C. to 300° C. for one hour at 3 mm. to 10 mm. pressure is usually sufficient. The plasticizer is then cooled and is ready for use. Esterification may be facilitated by the use of a suitable catalyst, such as phosphoric acid, para toluene sulphonic acid or the like, in small percentage. The catalyst is removed or deactivated after the esterification is completed.

Upon heating the mixture, esterification occurs at random, and some long chain mono and di acid esters are formed, in conjunction with some simple mono acid glycol esters. If the mol percent of monoacid is high, a greater amount of simple mono acid glycol esters will be formed in these cases. As these products are relatively volatile it is desirable to remove them from the less volatile portion. However, when the mono acids become attached as terminal groups, further increases in chain length of such molecules are prevented. For this reason, the mono acids conveniently may be utilized to control the average chain length of the final product despite the random esterification that will occur. Thus, the ratio of monobasic acids to dibasic acids is important since the ratio or proportion of mono acid to di acid will control the probabilities that a specific compound will be formed at least in major proportions. For each two moles of monobasic acid, as required to terminate each chain, there should be an average of more than one mole of dibasic acid in the chain, or otherwise the volatility is likely to be excessive. On the other hand, compositions in which more than 8 molecules of dibasic acid are present in the chain to each two moles of monobasic acid, display undesirably high molecular weight and viscosity for good plasticizing action.

The controls just discussed express the maximum ranges which are desirable for the respective ingredients. Typical representative examples of various plasticizers embraced within the present invention are as follows:

EXAMPLES (All parts by weight)

*Example 1*

A low molecular weight ester polymer suitable for use as a plasticizer for vinyl type resins was made by esterification of the following materials in which, in respect to the formula previously discussed, $n=4$.

143 parts commercial pelargonic acid
376 parts azelaic acid
280 parts diethylene glycol Upon completion of the esterification the mixture was topped at 300° C. and 7 mm. pressure until 37 parts of volatile material was removed. The resulting product is a clear, amber, slightly viscous, liquid of low volatility, readily compatible with vinyl type resins. When blended with a vinyl resin using 40 parts of plasticizer and 60 parts of resin the mixture fluxed readily on a standard rubber mill at a temperature of 150° C. The milled sheet was then molded in a 6" by .075" chromium plated press for 4 minutes at 160° C. to obtain a uniform sample for test purposes. A pliable, clear sheet resulted, having a Shore hardness, B scale, of 63.

*Example 2*

87 parts caproic acid
219 parts of adipic acid
215 parts 1,5-pentane diol $n=4$

These materials, when processed in accordance with the procedure outlined in Example 1, give a slightly viscous liquid readily compatible with vinyl resins. When milled in the same ratio and manner as previously described a soft, flexible, clear sheet was obtained which gave a tensile strength of 1930 lbs./in.$^2$ with an elongation at break of 300%. This plastic sheet compared favorably with a similar sheet prepared using a solvent type plasticizer, but having the added advantage of very low volatility.

*Example 3*

100 parts coconut acids (25% of highest boiling fraction removed)
183 parts adipic acid
125 parts propylene glycol $n=$approximately 5

Upon completion of the esterification this product was not stripped but used as such since the amount of volatile material was quite low. The product had an acid number of 3.2 and a volatility loss of 2.4% when heated at 190° C. for 1½ hrs. in an open dish in a circulating air oven. When compounded with a vinyl plastic as described in Example 1, a soft, flexible, tough sheet was produced which showed no spew even on prolonged aging. The resin sheet had a Shore hardness, B scale, of 62.

*Example 4*

141 parts oleic acid
292 parts adipic acid
180 parts propylene glycol $n=8$

Completion of the esterification reaction gave a deep amber, viscous oil which was not stripped because of the extremely low volatile content. The product had an acid number of 8.7 and a hydroxyl value of 9.9. When milled with a vinyl resin as described in Example 1 a flexible, slightly cloudy sheet resulted which, however, showed only a trace of spew on long standing and which had a Shore hardness, B scale, of 63.

*Example 5*

156 parts caprylic/capric acid mix (10/7 ratio)
235 parts azelaic acid
195 parts diethylene glycol $n=2.5$ After completion of the esterification reaction the above product was stripped for 1 hour at 255° C. at an absolute pressure of 2 mm. of mercury and 70 parts of volatile material were removed. The pale amber fluid product had an acid number of 4.0 and a hydroxyl value of 8.1. When milled with a vinyl resin as described in Example 1, blending 20 parts of the above product with 20 parts of di octyl phthalate, and 60 parts of resin, a clear flexible sheet was obtained, which was superior to a sheet plasticized solely with di octyl phthalate in that it had a better resistance to loss of plasticizer at high temperature as well as superior flexibility at low temperature.

In general, the best results are obtained by utilizing proportions or by working in the mid ranges of the chain lengths or proportions which have been discussed to preserve the desired carbon-oxygen ratio although opposite extremes can be used. Thus, long chain mono acids, in conjunction with long chain diacids all compounded in a single ester, will produce a composition having relatively poorer compatibility with vinyl resins than an ester resulting from a short chain mono acid, and a long chain di acid, within the ranges specified, and vice versa.

The plasticizers of the present invention are compounded with vinyl resins in the usual manner, that is, by milling together the resin and the plasticizer in the proportions desired or by mechanically mixing to produce plasticisols or organosols.

Having described our invention, we claim:

A plasticizer for resins which is the esterification product of (a) 2 mols of a fatty oil acid containing from 6 to 18 carbon atoms and (b) from 4 to 8 mols of a dicarboxylic acid selected from the group consisting of adipic acid and azelaic acid, with (c) a substantially molecular equivalent amount of a glycol selected from the group consisting of propylene glycol and dipropylene glycol.

References Cited in the file of this patent

UNITED STATES PATENTS

| | | |
|---|---|---|
| 2,089,181 | Bradley | Aug. 10, 1937 |
| 2,104,168 | Rohm et al. | Jan. 4, 1938 |
| 2,106,703 | Cox et al. | Feb. 1, 1938 |
| 2,162,178 | Marasco et al. | June 13, 1939 |
| 2,206,171 | Ellis | July 2, 1940 |
| 2,366,667 | Deebel | Jan. 2, 1945 |
| 2,424,588 | Sparks et al. | July 29, 1947 |
| 2,441,555 | Barth et al. | May 18, 1948 |
| 2,512,723 | Lanham | June 27, 1950 |

FOREIGN PATENTS

| | | |
|---|---|---|
| 237,401 | Switzerland | Jan. 16, 1946 |